(12) United States Patent
Bonner et al.

(10) Patent No.: US 7,355,505 B2
(45) Date of Patent: Apr. 8, 2008

(54) SYSTEM AND METHOD FOR CONTROLLING ACCESS TO DESIGNATED AREA

(75) Inventors: Brett B. Bonner, Germantown, TN (US); Randall J. Jackson, Memphis, TN (US)

(73) Assignee: Fedex Corporation, Memphis, TN (US)

( * ) Notice: Subject to any disclaimer, the term of this patent is extended or adjusted under 35 U.S.C. 154(b) by 1267 days.

(21) Appl. No.: 09/836,350

(22) Filed: Apr. 18, 2001

(65) Prior Publication Data

US 2002/0153994 A1    Oct. 24, 2002

(51) Int. Cl.
H04Q 9/00     (2006.01)
H04Q 7/00     (2006.01)

(52) U.S. Cl. .................. 340/5.21; 340/5.7; 340/5.71; 340/7.1

(58) Field of Classification Search ............... 340/5.21, 340/5.7, 5.71, 7.1
See application file for complete search history.

(56) References Cited

U.S. PATENT DOCUMENTS

| | | | | |
|---|---|---|---|---|
| 4,736,203 A | * | 4/1988 | Sidlauskas | 340/5.53 |
| 4,754,255 A | * | 6/1988 | Sanders et al. | 307/10.4 |
| 4,988,992 A | * | 1/1991 | Heitschel et al. | 340/825.69 |
| 5,670,940 A | * | 9/1997 | Holcomb et al. | 340/543 |
| 5,774,053 A | | 6/1998 | Porter | |
| 5,872,513 A | | 2/1999 | Fitzgibbon et al. | |
| 5,926,106 A | | 7/1999 | Beran et al. | |
| 6,271,745 B1 | * | 8/2001 | Anzai et al. | 340/5.53 |
| 6,367,011 B1 | * | 4/2002 | Lee et al. | 713/172 |
| 6,484,260 B1 | * | 11/2002 | Scott et al. | 713/186 |
| 6,580,815 B1 | * | 6/2003 | Grajewski et al. | 382/124 |

* cited by examiner

*Primary Examiner*—Brian Zimmerman
*Assistant Examiner*—Scott Au
(74) *Attorney, Agent, or Firm*—Finnegan, Henderson, Farabow, Garrett & Dunner, L.L.P.

(57) ABSTRACT

A system and associated method for controlling access to a designated area. The system includes a programmable unit, a programming unit, a programmable tag, and a validation system. The programmable unit generates a first and second key for each access to the designated area. The programming unit generates an access key using the first key. The programmable tag stores the access key. The validation system includes a control unit, a memory, and a communication device. The control unit generates a validation key using the second key. The memory stores the validation key. The communication device establishes a data communication with the programmable tag to receive the access key therefrom. The control unit compares the access key and the validation key and causes the security device to allow access to the designated area if the access key matches the validation key.

28 Claims, 3 Drawing Sheets

ENCRYPTION KEY = 065

AGENT KEY = 18818

JULIAN DELIVERY DATE = 039

ADDRESS OF DESIGNATED AREA = 4215

AGENT

AGENT KEY = 065 + 4215

ACCESS KEY = 065 (18818 + 039 + 4215)

CUSTOMER

CUSTOMER KEY = 065 + 18818

VALIDATION KEY = 065 (18818 + 039 + 4215)

FIG. 3

SYSTEM AND METHOD FOR CONTROLLING ACCESS TO DESIGNATED AREA

BACKGROUND OF THE INVENTION

The present invention relates generally to systems and methods for controlling access to an area. More particularly, the present invention relates to a system and associated method for controlling access to a designated area having a security device to control access thereto.

Frequently, homeowners need to be personally present at their homes for service personnel. For example, homeowners need be present at their homes to receive delivered packages. In many situations, however, homeowners need to attend to other matters and may not personally receive packages at their homes.

If a homeowner cannot be present to receive a package, a delivery person may opt to leave the package outside the home. But this option raises a theft concern. Providing the delivery person a home key is another option. This option, however, raises a security concern because of the ease of key copying. Also, the delivery person with the home key has access to the home indefinitely.

The security concern associated with an unattended package delivery exists not only at homes but also at other locations, such as a lock box or a storage room. Likewise, a similar security concern exists when a package needs to be picked up from an unattended location or when a repair service needs to be performed at an unattended location.

SUMMARY OF THE INVENTION

Accordingly, the present invention is directed to a system and method for controlling access to a designated area that obviate one or more of the limitations and disadvantages of prior art systems and methods. The advantages and purposes of the invention will be set forth in part in the description which follows, and in part will be obvious from the description, or may be learned by practice of the invention. The advantages and purposes of the invention will be realized and attained by the elements and combinations particularly pointed out in the appended claims.

To attain the advantages and in accordance with the purposes of the invention, as embodied and broadly described herein, the invention is directed to a system for controlling access to a designated area. The designated area has a security device to control access thereto. The system includes a programmable unit, a programming unit, a programmable tag, and a validation system. The programmable unit generates a first and second key for each access to the designated area. The programming unit generates an access key using the first key. The programmable tag stores the access key. The validation system includes a control unit, a memory, and a communication device. The control unit generates a validation key using the second key. The memory stores the validation key. The communication device establishes a data communication with the programmable tag to receive the access key therefrom. The control unit compares the access key and the validation key and causes the security device to allow access to the designated area if the access key matches the validation key.

In another aspect, the invention is directed to a method for controlling access to a designated area. The designated area has a security device to control access thereto. The method steps includes: generating a first and second key for each access to the designated area; using the first key, generating an access key; using the second key, generating a validation key; and comparing the access key and the validation key and causing the security device to allow access to the designated area if the access key matches the validation key.

It is to be understood that both the foregoing general description and the following detailed description are exemplary and explanatory only and are not restrictive of the invention, as claimed.

BRIEF DESCRIPTION OF THE DRAWINGS

The accompanying drawings are included to provide a further understanding of the invention and are incorporated in and constitute a part of this specification. The drawings illustrate an embodiment of the invention and, together with the description, serve to explain the principles of the invention. In the drawings.

FIG. 3 lists arbitrary and exemplary numerical values of various keys and other data used in describing the access control steps illustrated in FIG. 2.

DETAILED DESCRIPTION

Reference will now be made in detail to the presently preferred embodiment of the present invention, an example of which is illustrated in the accompanying drawings. Wherever possible, the same reference numbers will be used throughout the drawings to refer to the same or like parts. An exemplary embodiment of a system for controlling access to a designated area is shown in FIG. 1 and is designated generally by reference number 10.

For the purposes of the following description, the term "key" refers to an arrangement of numbers, characters, symbols, or any combination thereof, which may be recognized by (1) both a programmable device and a human or (2) a programmable device alone.

Figure 1:
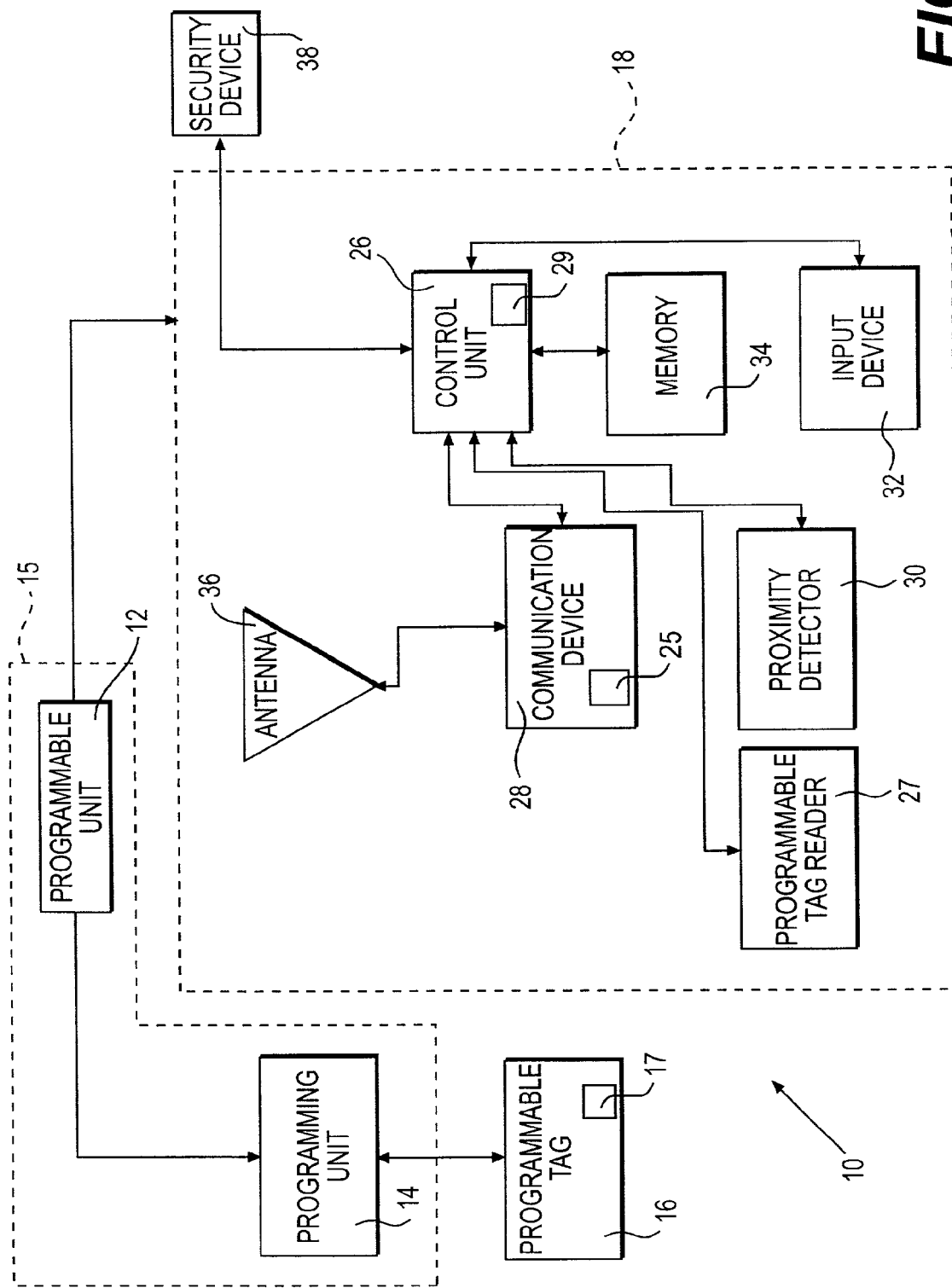
FIG. 1 is a schematic block diagram of an access control system and its components in accordance with the present invention.

In accordance with the present invention and illustrated in FIG. 1, an access control system 10 includes a programmable unit 12, a programming unit 14, a programmable tag 16, a validation system 18, and a security device 38. Security device 38 is installed on a security barrier (e.g., door) of a designated area (e.g., entry area, foyer, storage room, lock box, or garage). By locking or unlocking the security barrier, security device 38 controls access to the designated area. Preferably, security device 38 is an electronically controlled locking mechanism, such as an electronic lock, or a garage door opener.

As will be explained in greater detail below, programmable unit 12 generates an agent key and a customer key for each access to a designated area. Accordingly, any programmable device capable of generating an agent and customer key may serve as programmable unit 12. For example, desktop or portable personal computers, workstations, microprocessors, or Personal Digital Assistants (PDAs) may all serve as programmable unit 12. Preferably, programmable unit 12 is part of a computer system (not shown) that includes a data repository (not shown). Multiple programmable units 12 may be connected, or connectable, to the data repository through a wired, or wireless, data network.

Programming unit 14 is interfaced with programmable unit 12 to receive the agent key. Programmable unit 12 and programming unit 14 may exist as independent units. Alternatively, they may be integrated into a single unit as indicated at 15 in FIG. 1. After receiving the agent key from programmable unit 12, programming unit 14 generates an access key using the agent key and stores the access key in programmable tag 16. As will be explained in greater detail below, programmable tag 16 establishes a data communication with a communication device 28 through a wired or wireless connection to transmit the stored access key thereto. Accordingly, programmable tag 16 may be any device that is capable of storing and transmitting the access key.

Validation system 18 includes a control unit 26, an input device 32, and a memory 34. Validation system 18 controls the operation of security device 38 through control unit 26. The customer key generated in programmable unit 12 is entered into validation system 18 through input device 32. Input device 32 then sends the customer key to control unit 26. Using the customer key, control unit 26 then generates a validation key and stores it in memory 34. Subsequently, as will be explained in greater detail below, control unit 26 activates security device 38 to allow access to the designated area if a certain condition is satisfied. Preferably, control unit 26 is a microprocessor or similar electronic control and includes an internal clock 29 to keep track of time and date. Input device 32 is preferably a keypad although the present invention encompasses other input devices. Memory 34 is preferably a nonvolatile memory, which does not lose its stored data when the electric power source is removed.

Validation system 18 further includes a communication device 28, a proximity detector 30, and an antenna 36. Proximity detector 30 monitors a limited area outside the designated area for a presence of an object. Upon sensing an object, proximity detector 30 sends a signal to control unit 26. Control unit 26 then causes communication device 28 to start transmitting signals through antenna 36 to establish a data communication with programmable tag 16.

Preferably, programmable tag 16 and communication device 28 communicate wirelessly using radio frequency (RF) signals. Accordingly, programmable tag 16 and communication device 28 respectively include transceivers 17 and 25 for a wireless data communication therebetween. Alternatively, programmable tag 16 and communication device 28 may also communicate through a wired connection. For example, validation system 18 may include a different communication device, such as a programmable tag reader 27 exposed outside the designated area and interfaced to control unit 26. A wired data communication is then established by inserting programmable tag 16 into programmable tag reader 27. Communication device 28, proximity detector 30 and antenna 36 may be eliminated from validation system 18 if programmable tag reader 27 is utilized for a wired data communication. Alternatively, validation system 18 may include both communication device 28 and programmable tag reader 27 so that validation system 18 can establish both a wired and wireless data communication with programmable tag 16.

Figure 2:
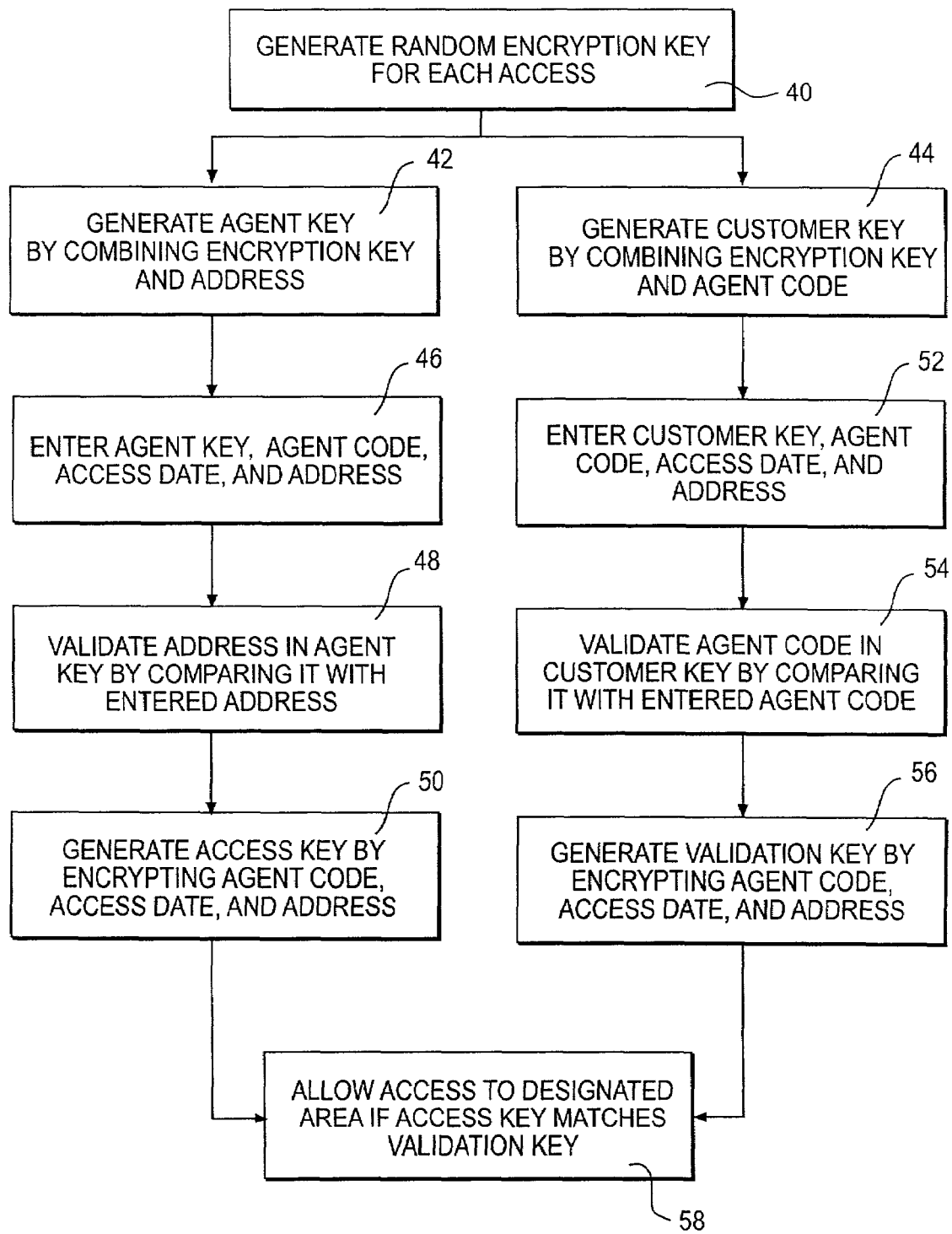
FIG. 2 is a block diagram illustrating access control steps in accordance with the present invention.

FIG. 2 illustrates the access control steps in detail. FIG. 3 lists exemplary numerical values of various keys and other data used in describing the access control steps of FIG. 2. The numerical values listed in FIG. 3 are arbitrary and exemplary in nature and should not be interpreted to expressly define or limit the scope of the present invention. FIG. 3 is presented solely for the purposes of explaining the principles of the present invention. Furthermore, instead of numerical values, the present invention may utilize numbers, characters, symbols, or any combination thereof for various keys and other data.

As previously described, programmable unit 12 generates an agent key and a customer key for each access to a designated area. The agent that will access the designated area receives the agent key. On the other hand, the customer authorizing an unattended access to a designated area receives the customer key. As illustrated at 40, programmable unit 12 first randomly generates an encryption key (e.g., 065) for each access to a designated area. Then, programmable unit 12 generates the agent key by combining the encryption key with a piece of information about the designated area. On the other hand, programmable unit 12 generates the customer key by combining the same encryption key with a piece of information about the agent. Preferably, the agent key includes the encryption key and the address (e.g., 4215) of the designated area as indicated at 42. The customer key preferably includes the same encryption key and the agent code (e.g., 18818) as indicated at 44.

In addition to the agent key, the agent receives, either directly from the customer or from other entities requesting the agent's service, other access data such as the address of the designated area and the access date (e.g., 039, Julian Date for Feb. 8, 2000). The agent then enters the agent key, its agent code, the access date, and the address into programming unit 14 as indicated at 46. The agent separately receives and enters the address of the designated area although the agent key includes the same address. Programming unit 14 may convert the separately-received address into whichever form is suitable for a subsequent comparison with the address in the agent key. For example, if the separately-received address is in a text form and the address in the agent key is a numeric address, programming unit 14 converts the text address into its corresponding numeric address. Preferably, programming unit 14 and programmable unit 12 are interfaced so that programming unit 14 receives the agent key and other access data from programmable unit 12 and performs necessary operations without any manual input by the agent.

Subsequently, programming unit 14 performs an internal validation before generating an access key. Specifically as indicated at 48, programming unit 14 compares the address in the agent key with the separately-entered address. If they match, using the encryption key, programming unit 14 encrypts the agent code, the access date, and the address as indicated at 50, and thereby generates an encrypted access key (e.g., 065(18818+039+4215)). Finally, programming unit 14 stores the encrypted access key in programmable tag 16. Preferably, programmable tag 16 is a portable device that can store either a single or multiple encrypted access keys for multiple different addresses and/or different access dates.

On the other hand, the customer receives, either directly from the agent or from other entities requesting the agent's service, the customer key and other access data such as the access date and the agent code. As indicated at 52 in FIG. 2, the customer then enters the customer key, the agent code, the address of the designated area, and the access date into validation system 18 using input device 32. The customer separately receives the agent code although the customer key includes the same agent code. Validation system 18 may convert the separately-received agent code into whichever form is suitable for a subsequent comparison with the agent code in the customer key. For example, if the separately-received agent code is the agent's name (e.g., Federal Express) and the agent code in the customer key is in a numeric form, validation system 18 coverts the name of the agent into its corresponding numeric agent code when the customer enters the name of the agent into input device 32.

After the customer enters the customer key, the separately-received agent code, the access date, and the address of the designated area, control unit 26 performs an internal validation before generating a validation key. Specifically, control unit 26 compares the agent code in the customer key and the separately-entered agent code as indicated at 54. If they match, using the encryption key, control unit 26 encrypts the agent code, the access date, and the address as indicated at 56, and thereby generates an encrypted validation key (e.g., 065(18818+039+4215)). Finally, control unit 26 stores the encrypted validation key in memory 34. By repeating the steps described above, the customer can store in memory 34 of validation system 18 multiple validation keys corresponding to multiple different agents and/or different access dates.

On the access date, control unit 26 activates proximity detector 30 to monitor a limited area outside the customer's designated area for an object (e.g., agent's vehicle or agent's employee). Alternatively, proximity detector 30 may be active all the time so that control unit 26 needs not activate and/or deactivate it on a particular access date. When proximity detector 30 senses an object, control unit 26 causes communication device 28 to begin transmitting radio frequency (RF) signals through antenna 36. Thus, when the agent's employee or vehicle arrives at the designated area and triggers proximity detector 30, communication device 28 will initiate and establish a wireless data communication with programmable tag 16.

Programmable tag 16 may be physically carried by the agent's employee or may be left in a vehicle that the agent's employee operates. As previously mentioned, programmable tag 16 may contain either a single or multiple encrypted access keys for multiple different addresses and/or different access dates. Also, in case of a package delivery, programmable tag 16 may be removably attached to the package.

Programmable tag 16 detects the radio frequency signals transmitted from communication device 28 and responds by transmitting the encrypted access key stored therein. At the same time, programmable tag 16 transmits other access information such as the programmable tag number and the identity of the agent's employee accessing the designated area (e.g., John Smith or Employee Identification Number). After communication device 28 receives the encrypted access key and other access information, it sends them to control unit 26. Control unit 26 then compares the encrypted access key with the encrypted validation key stored in memory 34 for the current date. If the encrypted access key matches the encrypted validation key, control unit 26 activates security device 38 to allow the agent's employee access to the designated area as indicated at 58 in FIG. 2.

Control unit 26 keeps security device 38 activated only for a predetermined period of time. After the predetermined period of time, control unit 26 deactivates security device 38 to terminate the access to the designated area. Preferably, control unit 26 is programmed so that it prevents further access to the designated area after the predetermined period of time. In other words, only a one-time access is allowed per validation key.

After terminating the access, control unit 26 stores the identity of the agent's employee accessing the designated area, and the access time and date in memory 34 for access records. Also, communication device 28 transmits to and stores in programmable tag 16 the access time and date for access records. As described previously, instead of a wireless communication, validation system 18 may communicate with programmable tag 16 through a wired connection using programmable tag reader 27 exposed outside the designated area. Alternatively, validation system 18 may include both communication devices 28 and 27 for both a wireless and wired data communication.

Subsequently, the access records stored in programmable tag 16 are uploaded to a data repository. The access records in programmable tag 16 may be wirelessly transmitted to the data repository on a real-time basis. Also, they may be uploaded in the agent's vehicle or local headquarter.

As evident from the foregoing description, the present invention creates multiple layers of security measures against unauthorized access. First, an encryption key, randomly generated for each access to a designated area, provides a security measure against unauthorized access by an agent. Two valid encryption keys are required for an agent to access the same designated area twice. A single valid encryption key generates a single valid access key, which allows only a one-time access to the designated area.

Second, the fact that an agent key differs from a customer key provides a security measure against unauthorized access by a third party. Even with the agent key or the customer key, a third party cannot generate a valid access key unless the third party knows the valid numeric address, the valid agent code, and the valid access date. Moreover, even knowing the valid agent code, the valid numeric address, and the valid access date, the third party may not access the customer's designated area unless the third party obtains programmable tag 16 with which communication device 28 can establish a data communication.

Finally, customers provide another security measure against unauthorized access. For an agent to access a customer's designated area, the customer must program validation system 18. Without the customer's cooperation, an agent cannot access the customer's designated area. Thus, even after agreeing to an unattended access by an agent, a customer may be personally present at the designated area to oversee the agent's access, and therefore may not program validation system 18.

The present invention may be utilized in a variety of ways. The present invention can be used not only for a delivery/pickup of a package to and from a designated area but also for a service to be performed at a designated area. For example, a homeowner may permit a service agent (e.g., repair person) to access a designated area on a specified date. As previously explained, the service agent will have only a one-time access and cannot access the same designated area twice without obtaining another valid access key.

It will be apparent to those skilled in the art that various modifications and variations can be made to the system and method of the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for controlling access to a designated area, the designated area having a security device to control access thereto, comprising:

a programmable unit to generate a first and second key for each access to the designated area;

a programming unit to generate an access key using the first key;

a programmable tag to store the access key; and a validation system including a control unit to generate a validation key using the second key, a memory to store the validation key, and a communication device to establish a data communication with the programmable tag to receive the access key therefrom, the control unit comparing the access key and the validation key and causing the security device to allow access to the designated area if the access key matches the validation key.

2. The system of claim 1, wherein the programmable unit and the programming unit are integrated in a single unit.

3. The system of claim 1, wherein the control unit is a microprocessor.

4. The system of claim 1, wherein the memory is a nonvolatile memory.

5. The system of claim 1, wherein the communication device includes a transceiver to establish a wireless data communication with a corresponding transceiver included in the programmable tag.

6. The system of claim 5, wherein the transceivers are radio frequency transceivers.

7. The system of claim 6, wherein the validation system includes an antenna for transmitting and receiving radio frequency signals.

8. The system of claim 5, wherein the validation system further includes a proximity detector causing the communication device to initiate the wireless data communication with the programmable tag upon detecting an object outside the designated area.

9. The system of claim 1, wherein the communication device is a programmable tag reader exposed outside the designated area to establish a wired data communication with the programmable tag.

10. The system of claim 1, wherein the validation system includes an input device to enter the second key.

11. The system of claim 10, wherein the input device is a keypad.

12. The system of claim 1, wherein the security device is an electronic lock.

13. The system of claim 1, wherein the security device is a garage door opener.

14. The system of claim 1, wherein, for each access to the designated area, the programmable unit randomly generates an encryption key to be included in both the first and second keys.

15. The system of claim 1, wherein the control unit causes the security device to terminate the access to the designated area after a predetermined period of time.

16. The system of claim 15, wherein the control unit prevents further access to the designated area after the predetermined period of time.

17. The system of claim 1, wherein the control unit includes a clock to determine the time and date of the access.

18. The system of claim 17, wherein the control unit stores the time and date of the access in the memory.

19. The system of claim 17, wherein the communication device transmits to and stores in the programmable tag the time and date of the access.

20. A method for controlling access to a designated area, the designated area having a security device to control access thereto, comprising the steps of:
generating a first and second key for each access to the designated area;
using the first key, generating an access key;
using the second key, generating a validation key; and
comparing the access key and the validation key and causing the security device to allow access to the designated area if the access key matches the validation key.

21. The method of claim 20, wherein the first key generating step comprises the steps of:
randomly generating an encryption key; and
combining the encryption key with a third key.

22. The method of claim 21, wherein the second key generating step comprises the step of combining the encryption key with a fourth key.

23. The method of claim 22, wherein the third key is the address of the designated area and the fourth key is an agent code.

24. The method of claim 23, wherein the access key generating step comprises the steps of:
entering the first key, the agent code, the address, and an access date;
comparing the entered address and the address in the first and
using the encryption key, encrypting the agent code, the access date, and the address if the entered address matches the address in the first key.

25. The method of claim 24, wherein the validation key generating step comprises the steps of:
entering the second key, the agent code, the address, and the access date;
comparing the entered agent code and the agent code in the second key; and;
using the encryption key, encrypting the agent code, the access date, and the address if the entered agent code matches the agent code in the second key.

26. The method of claim 20, further comprising the step of causing the security device to terminate the access to the designated area after a predetermined period of time.

27. The method of claim 26, further comprising the step of preventing further access to the designated area after the predetermined period of time.

28. The method of claim 20, further comprising the step of storing the time and date of the access.

* * * * *

UNITED STATES PATENT AND TRADEMARK OFFICE
CERTIFICATE OF CORRECTION

| | | |
|---|---|---|
| PATENT NO. | : 7,355,505 B2 | Page 1 of 1 |
| APPLICATION NO. | : 09/836350 | |
| DATED | : April 8, 2008 | |
| INVENTOR(S) | : Brett B. Bonner et al. | |

It is certified that error appears in the above-identified patent and that said Letters Patent is hereby corrected as shown below:

In claim 24, column 8, lines 31-32, "first and" should read --first key; and--.

Signed and Sealed this
Thirty-first Day of May, 2011

David J. Kappos
*Director of the United States Patent and Trademark Office*